United States Patent
Kielbasa et al.

(10) Patent No.: US 11,449,141 B2
(45) Date of Patent: Sep. 20, 2022

(54) SYSTEMATIC BILATERAL SITUATIONAL AWARENESS TRACKING APPARATUS AND METHOD

(71) Applicant: BIOFLI TECHNOLOGIES, INC., El Cajon, CA (US)

(72) Inventors: Michael P. Kielbasa, El Cajon, CA (US); Matthew P. Kielbasa, El Cajon, CA (US)

(73) Assignee: BIOFLI TECHNOLOGIES, INC., San Diego, CA (US)

( * ) Notice: Subject to any disclaimer, the term of this patent is extended or adjusted under 35 U.S.C. 154(b) by 50 days.

(21) Appl. No.: 16/989,591

(22) Filed: Aug. 10, 2020

(65) Prior Publication Data

US 2021/0216140 A1    Jul. 15, 2021

Related U.S. Application Data

(62) Division of application No. 16/164,596, filed on Oct. 18, 2018, now Pat. No. 10,747,317.

(Continued)

(51) Int. Cl.
| | |
|---|---|
| G08B 6/00 | (2006.01) |
| G06F 3/01 | (2006.01) |
| G08B 3/10 | (2006.01) |
| G08B 5/22 | (2006.01) |
| G06F 3/0346 | (2013.01) |
| G08B 21/06 | (2006.01) |

(52) U.S. Cl.
CPC .............. *G06F 3/015* (2013.01); *G06F 3/016* (2013.01); *G06F 3/017* (2013.01); *G06F 3/0346* (2013.01); *G08B 3/10* (2013.01); *G08B 5/22* (2013.01); *G08B 6/00* (2013.01); *G08B 21/06* (2013.01); *G06F 2203/011* (2013.01)

(58) Field of Classification Search
CPC ...... G06F 3/015; G06F 2203/011; G08B 3/10
See application file for complete search history.

(56) References Cited

U.S. PATENT DOCUMENTS

| | | | |
|---|---|---|---|
| 4,875,030 | A | 10/1989 | Chiu |
| 5,579,777 | A | 12/1996 | Suga |

(Continued)

OTHER PUBLICATIONS

Dawson, Drew, "Quantitative Similarity Between the Cognitive Psychomotor Performance Decrement Associated With Sustained Wakefulness and Alcohol Intoxication," Queensland Mini.

(Continued)

*Primary Examiner* — Qutbuddin Ghulamali
(74) *Attorney, Agent, or Firm* — Gary L. Eastman, Esq.; Eastman IP

(57) ABSTRACT

A systematic bilateral situational awareness tracking apparatus provides a wearable device with neurosynaptic, EEG, EKG, SpO2, body temperature, and blink sensors. A processor monitors the sensors and determines the wearer's state of situational awareness. When the wearer is fatigued or otherwise less alert, the device provides haptic feedback in conjunction with audio and visual alerts to the wearer, and text message alerts to others. The device integrates with dynamic assessment of situational awareness (DASA) software in order to allow further analysis of the wearer's situational awareness capability and longevity, and prediction of times of peak wakefulness and fatigue.

16 Claims, 9 Drawing Sheets

Related U.S. Application Data

(60) Provisional application No. 62/573,847, filed on Oct. 18, 2017.

(56) References Cited

U.S. PATENT DOCUMENTS

| | | | |
|---|---|---|---|
| 6,067,020 | A | 5/2000 | Wimmer |
| 6,154,141 | A | 11/2000 | Prater et al. |
| 7,126,485 | B2 | 10/2006 | Cece et al. |
| 7,301,465 | B2 | 11/2007 | Tengshe et al. |
| 7,621,871 | B2 | 11/2009 | Downs |
| 7,766,827 | B2 | 8/2010 | Balkin et al. |
| 8,224,433 | B2 | 7/2012 | Suffin |
| 8,885,559 | B2 | 11/2014 | Schmidt et al. |
| 2003/0018242 | A1 | 1/2003 | Hursh et al. |
| 2004/0090334 | A1 | 5/2004 | Zhang et al. |
| 2005/0033122 | A1* | 2/2005 | Balkin .................. A61B 5/4812 600/300 |
| 2006/0200008 | A1 | 9/2006 | Moore-Ede |
| 2008/0004909 | A1 | 1/2008 | Jung et al. |
| 2009/0312998 | A1 | 12/2009 | Berckmans |
| 2011/0212422 | A1 | 9/2011 | O'Donnell |
| 2012/0065893 | A1 | 3/2012 | Lee |
| 2013/0209977 | A1 | 8/2013 | Lathan et al. |
| 2013/0249785 | A1* | 9/2013 | Alameh ................ G06F 3/0304 345/156 |
| 2013/0304326 | A1 | 11/2013 | Van Dongen |
| 2014/0361900 | A1 | 12/2014 | Nothacker et al. |
| 2014/0379275 | A1 | 12/2014 | Yuen et al. |
| 2015/0164418 | A1 | 6/2015 | Johnson |
| 2016/0055408 | A1 | 2/2016 | Akopyan |
| 2020/0393901 | A1* | 12/2020 | Rodriguez Bravo ... G06F 3/017 |
| 2021/0141453 | A1* | 5/2021 | Miller, III .............. A61B 5/369 |

OTHER PUBLICATIONS

Oakley Inc., Razrwire "Quick Start Guide", Motorola, Sep. 28, 2006, 12 pages.

Time NewsFeed, "New Auto Technology Can Tell When You're Driving While Drowsy", retrieved from http://newsfeed.time.com/2011/1/106/new-auto-technology-can-tell-when-youre-driving-while-drowsy/, on Oct. 6, 2011, 7 pages.

International Search Report received in application PCT/US16/36428, dated Sep. 7, 2016, 12 pages.

Mauk Muhammad Naeem Mannan, Muhammad Ahmad Kamran, and Myung Yung Jeong, Identification and Removal of Physiological Artifacts From Electroencephalogram Signals: A Review, IEEE Access, May 31, 2018, pp. 30630-30652, vol. 6, IEEE.

\* cited by examiner

TO FIG.8 CONT.

FROM FIG.8

| | | | | | |
|---|---|---|---|---|---|
| POSTURE CONTROL/ ACCELEROMETER/HELOFECT | | | | | |
| <15 DEGREE | x | | | | YES |
| <30 DEGREE | | x | x | x | |
| <45 DEGREE | | x | x | x | |
| THERMOSENSOR | | | | | |
| >35.0- | | | | | YES |
| <36.0-37.0> | x | x | | x | |
| <37.1+ | | | | x | |
| HUMIDITY | | | | | |
| IMPEDENCE | | x | x | x | YES |
| VOLUME | | | x | x | |
| pH SENSOR | | | | | |
| SKIN'S pH <4.9 | | | x | x | YES |
| SKIN'S pH <5.0-5.8 | x | x | x | | |
| SKIN'S pH <5.9>6 | | | | x | |
| BLOOD MEASUREMENTS | | | | x | TBD |
| ELECTROLYTES - SODIUM | | | | | |
| >135-145 mEq/L< | x | x | x | x | |
| <135 mEq/L | | x | x | x | |
| >145 mEq/L | | x | x | x | |
| ELECTROLYTES - POTASSIUM | | | | | |
| <3.50 HYPOKALEMIA | | | x | x | |
| <3.5-5.0 mEQ/L | x | x | x | x | |
| >5.0 mEQ/L | | x | x | x | |

FIG. 8 CONT.

SYSTEMATIC BILATERAL SITUATIONAL AWARENESS TRACKING APPARATUS AND METHOD

RELATED APPLICATIONS

This application is a divisional of U.S. Utility patent application Ser. No. 16/164,569 filed Oct. 18, 2018, entitled "Systematic Bilateral Situational Awareness Tracking Apparatus and Method," and currently co-pending, which in turn claims priority to U.S. Provisional Patent Application Ser. No. 62/573,847 filed Oct. 18, 2017, entitled "SYSTEMATIC BILATERAL SITUATIONAL AWARENESS TRACKING APPARATUS AND METHOD", both of which are fully incorporated herein by reference.

FIELD OF THE INVENTION

The present invention pertains generally to monitoring alertness. More specifically, the present invention pertains to a device for monitoring various physiological indicators of the situational awareness of a user and alerting the user and others when the user becomes drowsy. The present invention is particularly, but not exclusively, useful as a device for warning workers or drivers of a higher accident risk due to fatigue.

BACKGROUND OF THE INVENTION

Somnolence, or drowsiness, can create dangerous conditions when performing tasks that require attention, and results in lower quality work even in less dangerous tasks. Fatigue can result in brief interruptions in consciousness referred to as "microsleep." Drowsiness also slows reaction times. The disastrous results have been documented particularly with respect to driving, with the National Highway Traffic Safety Administration estimating over 72,000 accidents and 800 fatalities per year caused by drowsy driving. The CDC has suggested that the numbers are underestimated, and that drowsiness could be a factor in up to 6,000 fatal crashes annually. Drowsiness in pilots, operators of heavy machinery, and those working other dangerous jobs presents similar risks.

Fatigue can sometimes be avoided or minimized. Although regular rhythms and cycles in the body and long periods of work necessarily result in the need for rest, including sleep, certain habits and behaviors can contribute to a quicker occurrence of fatigue. For example, poor posture can put unnecessary stress on muscles (not to mention joints and ligaments) and cut off circulation, causing the body to use its energy inefficiently and ultimately causing fatigue. Some studies have associated poor posture with depressed feelings, lower confidence, and increased stress, all of which can affect a person's alertness and speed up the onset of fatigue. If good posture were maintained, a person would remain alert for a longer period of time.

In light of the above, it would be useful to provide a wearable device that determines when the wearer is distracted or falling asleep and provides an alert to return the user to an attentive state.

It would be further advantageous to provide a wearable device that monitors and corrects the wearer's posture.

It would be further advantageous to provide a wearable device that alerts third parties when the wearer is working or driving in a state of dangerously low situational awareness.

It would be further advantageous to provide a wearable device that provides alerts to return a distracted user to an attentive state, warns third parties when the wearer is working or driving in a state of dangerously low situational awareness, and alerts emergency personnel during a medical emergency.

SUMMARY OF THE INVENTION

The present invention provides a device for monitoring various physiological signals in the body in order to determine when the wearer is in a lowered state of situational awareness and provide appropriate feedback. The present invention may be operative with a situational awareness analysis and fatigue management system, such as is disclosed in U.S. patent application Ser. No. 14/733,466, entitled "Situational awareness analysis and fatigue management system," filed Jun. 8, 2015, and incorporated herein by reference in its entirety. An electronic alerting device forms part of the present invention, some embodiments of which comprise features similar to those described in U.S. patent application Ser. No. 12/880,587 for an "Electronic alerting device and associated method," filed Sep. 13, 2010, and incorporated herein by reference in its entirety, which issued as U.S. Pat. No. 8,610,585 on Dec. 17, 2013.

The present invention includes a situational awareness sensor device covered by a housing shaped to fit comfortably on the back surface of the wearer's neck. More particularly, the housing is designed for bilateral positioning of sensors just outside the midline cervical vertebrae C1-C5 so that internal neurosynaptic sensors can capture signals passing through the central nervous system.

The left and right sides of the situational awareness sensor device each contain a region of sensors, which include accelerometers; brain activity sensors, such as neurosensors, EEGs, or both; heart rate sensors, EKGs or both; SpO2 sensors; and body temperature sensors. Along the center of the device, between the sensor regions, are an on/off button, wireless communications circuitry, GPS circuitry, a motion sensor, a microprocessor, a battery, a haptic feedback element, and an audio alert element.

The situational awareness sensor device additionally communicates with external devices, which may contain further sensors providing additional information to the situational awareness sensor device, or alert elements providing alerts from the situational awareness sensor device to the user. For example, an external device for placement near the wearer's eye may provide a blink sensor designed to monitor and communicate eyelid movements to the situational awareness sensor device. The same or another external device may provide a visual alert to the wearer. A mobile phone may communicate as an external device with the situational awareness sensor, and may provide an application programmed to send text message alerts to one or more third parties.

The microprocessor receives data from the sensors and compares the readings with predetermined parameters in order to identify any abnormal readings. In the case of an abnormal reading, especially readings suggesting fatigue on the part of the wearer, the microprocessor provides a vibrational alert through the haptic feedback element, an audio alert through the audio alert element, a visual alert, a text message alert to one or more third parties, or a combination of the foregoing alerts. The accelerometer provides a further mechanism for monitoring the user's posture, and haptic feedback is used to notify the user of poor posture so that it can be corrected. A beneficial side effect of correcting the user's posture is that when posture is correct or corrected, the highway of flow (flow of blood, nerve signals, position of the device, etc.) is optimal and the sensors will pick up the best possible biofeedback signal.

BRIEF DESCRIPTION OF THE DRAWINGS

The nature, object, and advantages of the present invention will become more apparent to those skilled in the art after considering the following detailed description in connection with the accompanying drawings, in which like reference numerals designate like parts throughout, and wherein.

DETAILED DESCRIPTION

The present invention provides an apparatus and a method for determining the situational awareness of a person and alerting the person or others of conditions of lowered situational awareness.

Figure 1:
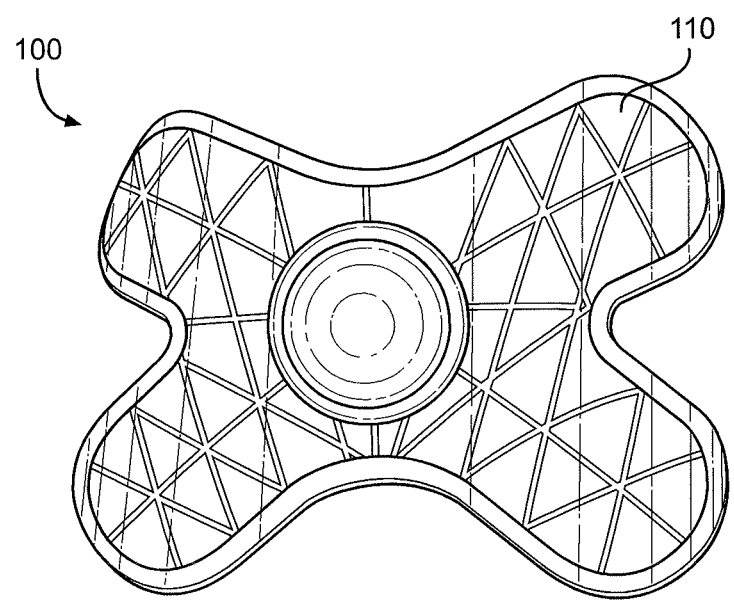
FIG. 1 is a perspective view of a preferred embodiment of the present invention showing a situational awareness sensor device.

Referring initially to FIG. 1, a situational awareness sensor device of the present invention is shown and generally designated 100. The situational awareness sensor device 100 comprises a housing 110, which encloses a variety of sensors, a microprocessor, and communications and alert apparatus as described more fully below. The housing 110 has a curved shape for comfortable placement on a user's neck, and, in preferred embodiments, has a small degree of flexibility in order to fit snugly around the back of the neck without causing discomfort or injury. A butterfly, or roughly "X" shape, used in a preferred embodiment provides both an aesthetic form and an ideal shape for positioning and placement on a user's upper neck. Other shapes for the housing 110 are also contemplated. Housing 110 may comprise nanomaterials in order to provide the desired properties for comfortable long-term use. By using nanomaterials in construction of the housing 110, a hypoallergenic housing 110 with the desired degree of flexibility—enough to comfortably and snugly fit the device 110 onto the wearer's neck, but not enough to allow damage to internal electronic components—can be provided.

An adhesive, such as Geckskin, may be provided in order to attach the device 100 to a wearer's neck. In a preferred embodiment, a double-sided adhesive is used, with one side attached to the housing 110, and the other side attached to the user.

Figure 2:
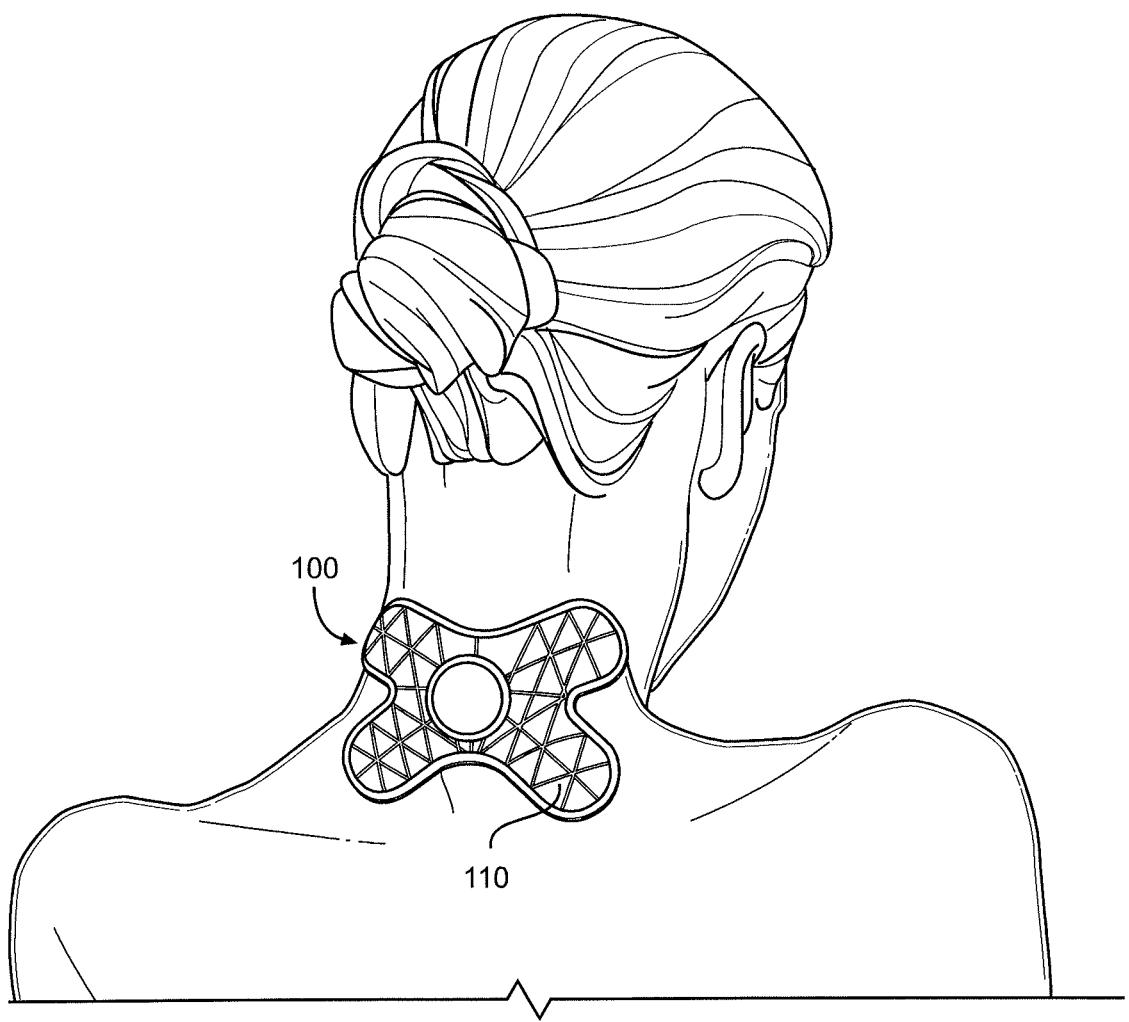
FIG. 2 is a perspective view of the device of FIG. 1, showing placement of the device on a user.

Referring now to FIG. 2, the situational awareness sensor device 100 is shown worn by a user. The device 100 is configured for placement just outside the midline cervical vertebrae C1-C5 so that bilateral sensors inside the housing 110 can capture signals passing through the central nervous system.

Figure 3:
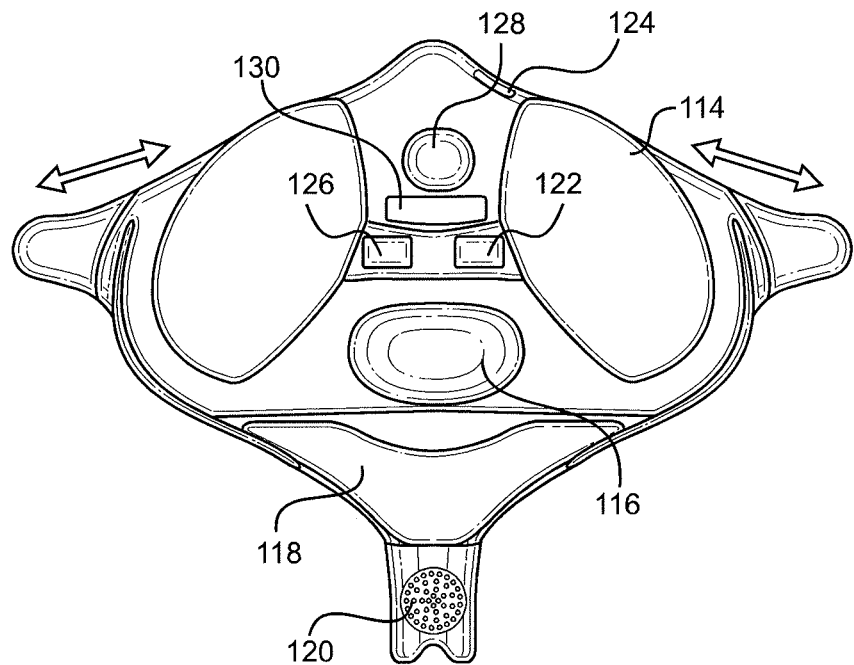
FIG. 3 is a diagram of a preferred embodiment of the present invention showing the relative placement of various components of a situational awareness sensor device.

Referring now to FIG. 3, a diagram of the placement of sensors and other components in a preferred embodiment of the present invention is shown. As shown in FIG. 3, sensors 114 are positioned bilaterally within the housing 110 of the situational awareness sensor device 100 so that one or more of each sensor is positioned on each side of the cervical vertebrae.

Among the sensors 114 are motion detection sensors, neurosensors, EEG, heart rate, SpO2, breathing rate, and body temperature sensors. In some embodiments, blood values sensors are also present.

The motion detection sensors comprise a three-axis accelerometer which allows for measurement of the tilt angle of the situational awareness sensor device 100. By measuring the tilt angle, the present invention is able to determine when the user's head is dropping, tilting, or rotating. By recognizing abnormal movements, the system determines that the user may be drowsy or distracted. A tilt angle of greater than forty-five (45) degrees indicates that the user may be asleep, and the system tries to corroborate the indication with other sensors in order to determine whether to trigger an alert. In a preferred embodiment of the present invention, the motion detection sensors are also used to monitor the user's posture.

In some embodiments, the motion detection sensors are also monitored by the situational awareness sensor device 100 in order to implement an activity tracker, including counting steps and measuring time periods of increased physical activity. The statistics compiled by the activity tracker can then be viewed by the user on a mobile phone connected to the device 100, via a website, and via a computer program. The user may view the step count and other activity statistics in real time on a mobile phone connected via Bluetooth to the device 100.

The neurosensors use neurosynaptic technology to detect the frequency of the signals passing through a neuron being measured. A neuron acts on other neurons through the release of neurotransmitters, which bind to receptors on the receiving neurons. When activated, a receptor can excite the receiving neuron, causing an increase in firing rate; inhibit the receiving neuron, causing a decrease in firing rate; or modulate the receiving neuron, causing longer-term changes. The firing of a neuron involves an electrochemical process in which sodium channels are opened, allowing sodium ions to pass through the neuron's membrane and reverse the membrane potential, in turn causing the exit of potassium ions, the process proceeding down the length of an axon. The changes, called an action potential, comprise a nerve impulse or nerve signal. The action potential comprises a change in potential from between about negative seventy (−70) and negative eighty (−80) millivolts to about forty (+40) millivolts. Thus the neuron generates a small-amplitude electrical signal at the frequency of its firing.

The EEG sensors are positioned over the lower head and upper neck area in order to obtain readings from the O1 and O2 sites and thus measure occipital lobe activity. The EEG sensors are used to measure electrical activity in the brain and central nervous system. Their main purpose is to check for abnormalities or changes in body chemistries that affect the brain. More particularly, an EEG reading is expected to show beta waves (about 12 Hz or higher) while the user is active. When the user is in a relaxed state with eyes partially or fully closed, the EEG readings approach the alpha wave band (lower than about 12 Hz), which may indicate drowsiness. When alpha waves are detected, the system tries to corroborate the indication of drowsiness or sleep with other sensors in order to determine whether to trigger an alert. The present invention more particularly measures the lower occipital regions of O1—related to image building—and O2—related to visualization of impressions—of the EEG.

Heart rate may be measured via EKG, or alongside SpO2 (blood oxygen saturation) via a pulse oximeter, or both. EEG readings are susceptible to interference from EKG signals and vice-versa, and both may experience interference from other sources. Digital Signal Processing (DSP) and known artifact removal techniques, such as Independent Component Analysis (ISA) in the case of EEG, may be used to separate useful signals from interference. In embodiments which use both EKG and pulse oximeter sensors, the pulse rate obtained by the pulse oximeter may be used to aid in cleanup of the EKG reading. DSP circuitry or programming can look for the unique shape of the EKG signal, and the pulse oximeter reading can aid and optimize the processing by providing the DSP circuitry or programming with a frequency at which the signal is expected.

The SpO2 sensor, which may be provided by a pulse oximeter, monitors oxygen flow and rate throughout the body. It picks up the oxygen binding to hemoglobin in red blood cells as it moves through the lungs. It is transported throughout the body as arterial blood. Two frequencies of light (red and infrared) are used to determine the percentage (%) of hemoglobin in the blood that is saturated with oxygen through fluid motion and perfusion. The user's SpO2 reading should be near 100%. Oxygen saturation below 90% may indicate a medical emergency. When the percentage of blood oxygen saturation falls into the low nineties, the system reviews other sensors for abnormal indications in order to determine whether to trigger an alert.

Respiratory rate, also known as ventilation rate, respiration rate, breathing rate, pulmonary ventilation rate, breathing frequency, and respiratory frequency (Rf), is measured as the number of breaths a person takes per minute. In general, a breathing rate of twelve (12) to twenty (20) breaths per minute is expected; breathing rates below twelve (12) breaths per minute or above twenty (20) breaths per minute may indicate a medical emergency.

Respiratory rate can be determined by a variety of methods, any of which are contemplated for use with the present invention. The pulse oximeter may be used for the breathing rate monitor by analyzing minor fluctuations in oxygen saturation and looking for a pattern that repeats between about ten (10) and about thirty (30) times per minute (from about 0.16 to about 0.5 Hz). Likewise, the accelerometer can be monitored for small repetitive movements with a period of about two (2) to about six (6) seconds, or between about ten (10) and about thirty (30) times per minute, the range of expected breathing rates. The EKG signal can be used to measure breathing rate by monitoring the change in magnitude of the signal, especially the R-wave. The movement from breathing changes the distance between the EKG electrodes and the user's heart, causing the magnitude of the signal to increase and decrease. By monitoring these changes, the user's breathing rate is determined. An embodiment of the present invention uses a combination of the above methods and compares the measurements of each in order to provide a more accurate measurement. In particular, the breathing rate calculated from the measurements of the pulse oximeter can be compared to that calculated from the measurements of the accelerometer. Alternatively, the pulse oximeter results can be compared to results obtained from the EKG. Alternatively, the EKG results can be compared to the accelerometer results. A preferred embodiment compares the results of all three, disregarding a result if it is significantly different (e.g. greater than 15% difference or outside an expected range) from the remaining two, and calculating the average of the remaining two or three estimates. Likewise, where two results are compared, one may be disregarded as an erroneous reading if it falls outside an expected range while the other falls within the range.

The body temperature sensors use non-contact infrared (IR) sensing to determine body temperature. Minute changes in body temperature can be an important indicator of the body's physiological response to changes in workload, task sequence, frustration, mental stress, etc. When someone is too hot, the blood vessels in their skin expand (dilate) to carry the excess heat to the skin's surface. One may begin to sweat, and as the sweat evaporates, it helps cool the body. When a person is too cold, their blood vessels narrow (contract) so that blood flow to the skin is reduced as a means of conserving body heat. One may start shivering, which is an involuntary, rapid contraction of the muscles. The vertebral arteries and veins demonstrate the necessary requirements for the skin thermometry method. As a site for temperature measurement, the temporal artery presents many benefits: it poses no risk of injury for patient or clinician and is suitable for all ages.

An embodiment of the present invention also includes blood values sensors configured to provide measurements of glucose, electrolytes, and blood flow. A preferred embodiment of the present invention monitors glucose levels through measurement of glucose and pH of the user's sweat.

Additional sensors may be provided which are external to the housing 110 of the situational awareness device 100. In preferred embodiments, such sensors communicate with the situational awareness device 100 via Bluetooth, but may also use Wi-Fi or USB to communicate with the situational awareness device 100.

A microprocessor 116 monitors the sensors 114 and any external sensors to determine whether alert criteria are met. The microprocessor can signal an alert to the user using haptic feedback via vibrational pads built into the situational awareness device 100, audio alerts through a built-in speaker 120, or through an external device. Communication with external devices can be wireless, through a built-in Bluetooth module 122 or Wifi, or wired through a built-in micro-USB port 124. The micro-USB port 124 also serves the secondary purpose of charging the device 100. The built-in speaker 120 may also provide a microphone so that, in emergencies, the user may use the device 100 to make a phone call. To make such a call, the device 100 would communicate with the user's phone through Bluetooth, and the user would hear the called party through the speaker 120; the user's voice, in turn, would be picked up through the microphone associated with the speaker 120. In general, the call would be initiated by a panic button on the device 100, and be made to a predetermined party previously entered into a mobile application by the user.

A GPS sensor 126 is present in the situational awareness sensor device 100, and allows the device 100 to communicate the user's location when sending an alert to a third party.

An on/off button 128 allows the user to deactivate the situational awareness sensor device 100 if the device is not handling a danger condition. When pressed, if the device 100 has not determined that a danger condition exists, it deactivates after completing any pending critical tasks, such as performing or communicating an alert.

The situational awareness sensor device 100 is powered by a battery 130. In a preferred embodiment, the battery 130 comprises a lithium-ion battery. The situational awareness sensor device 100 contains circuitry which monitors the charge of the battery 130 and alerts the user when the battery 130 charge is low. In a preferred embodiment, the alert comprises six (6) chirping sounds, played in two (2) sets of three (3) chirps.

Figure 4:
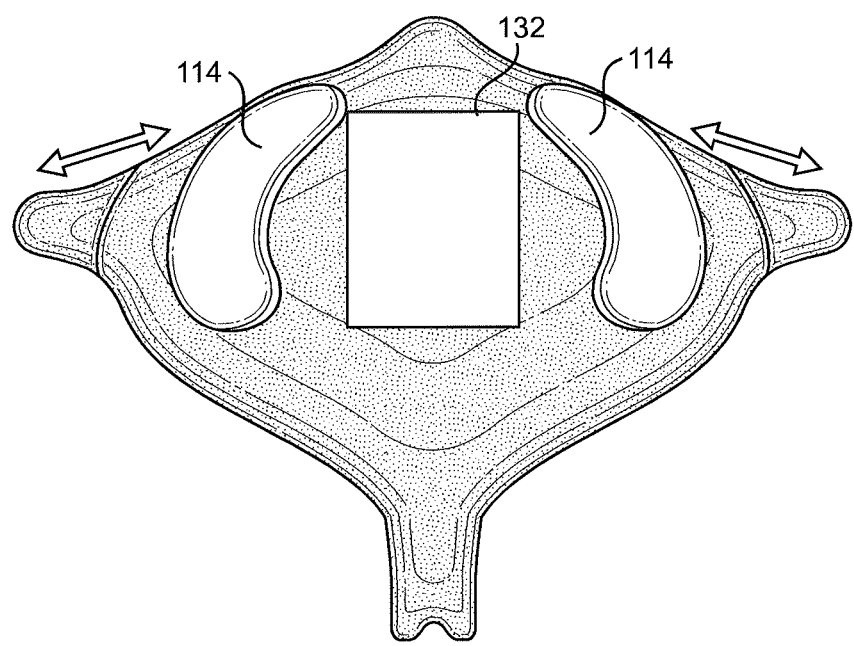
FIG. 4 is a back view of the device of FIG. 3, showing the portion of the device configured for placement against the user's skin.

As shown in FIG. 4, in order to maximize battery life, an embodiment of the present invention uses a thermoelectric circuit to convert the user's body heat into electricity to provide part of the energy source of the situational awareness sensor device 100. The surface of the housing 110 that sits against the user's skin has a region 132 of thermally conductive material. The difference in temperature between the user's skin and the opposite side of the housing 110 is used to generate a current through the thermoelectric effect. The amount of energy generated depends on the size of the region 132, which is about seven (4) square centimeters in a preferred embodiment, but is also highly sensitive to factors such as the ambient temperature and the amount of physical activity engaged in by the user.

Figure 5:
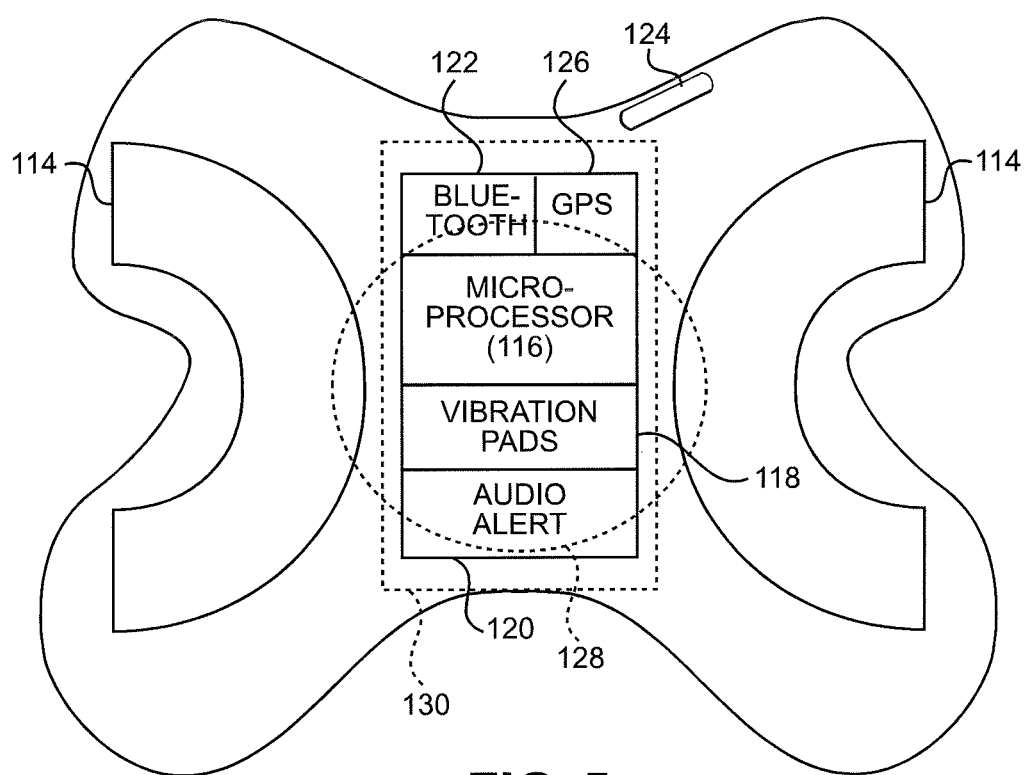
FIG. 5 is a diagram of the device of FIG. 1, showing how the positioning of components of the device may be adapted to other shapes.

Referring now to FIG. 5, a layout of components is shown adapted for the housing 110 of FIG. 1. The sensors 114 are positioned bilaterally about the midline as in other preferred embodiments. In between the sensors are the microprocessor 116, vibration pads 118, speaker 120 (with microphone in some embodiments, as discussed above), Bluetooth 122, micro-USB port 124, GPS receiver 126, and on/off button 128. The on/off button 128 sits above the other components on the housing 110 of the situational awareness sensor device 100 so that the user can access it as desired. A battery 130 is also positioned within the housing 110, and, as above, comprises a lithium-ion battery in a preferred embodiment. As described in connection with FIG. 4, the battery may be supported by a thermoelectric circuit in order to maximize battery life.

Figure 5A:
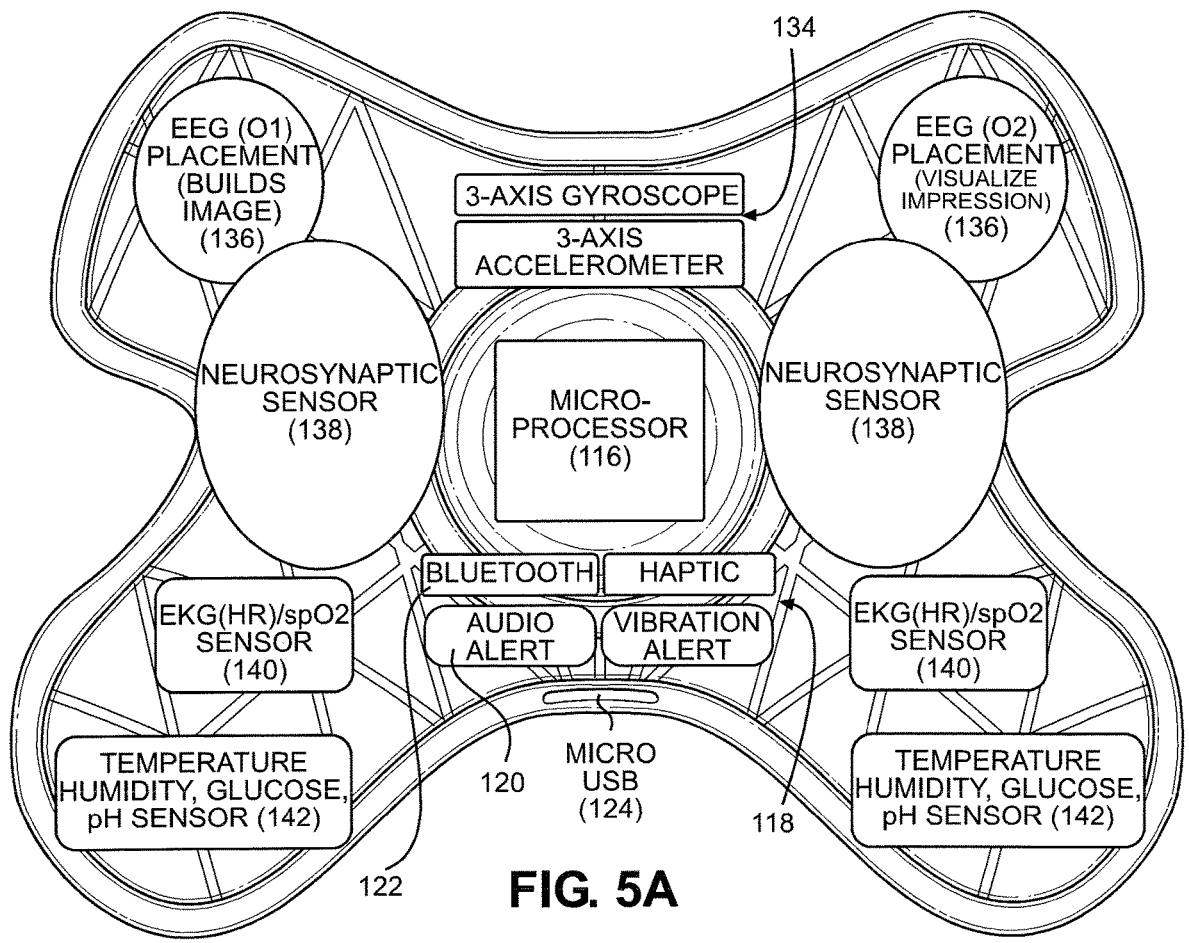
FIG. 5A is a diagram of the device of FIG. 1, showing the placement of various components and sensors in a preferred embodiment of the device.

Referring now to FIG. 5A, a layout of components and sensor in the housing 110 a preferred embodiment of the situational awareness sensor device 100. The microprocessor 116 is placed substantially in the center of the device, above the vibration pads 118, speaker 120, Bluetooth 122, and micro-USB port 124 components. The micro-USB port 124 is centered along the bottom of the device 100 for convenient access. Above the microprocessor 116 are the orientation components 134 including a three-axis accelerometer and a three-axis gyroscope. Not shown, however present, are GPS receiver 126, on/off button 128, and battery 130.

The approximate positions of the sensors 114 are also shown. One EEG sensor 136 is located on each side of the device 100 so that the EEG sensors 136 are positioned to provide readings from the O1 and O2 sites. Beneath each EEG sensor 136 is a neurosynaptic sensor 138 for reading the frequencies of action potentials, or nerve signals. Beneath the neurosynaptic sensors 138 are heart rate and SpO2 sensors 140, including EKG sensors. Temperature, humidity, glucose, and pH sensors 142 are located toward the bottom left and the bottom right of the device 100.

Figure 6:
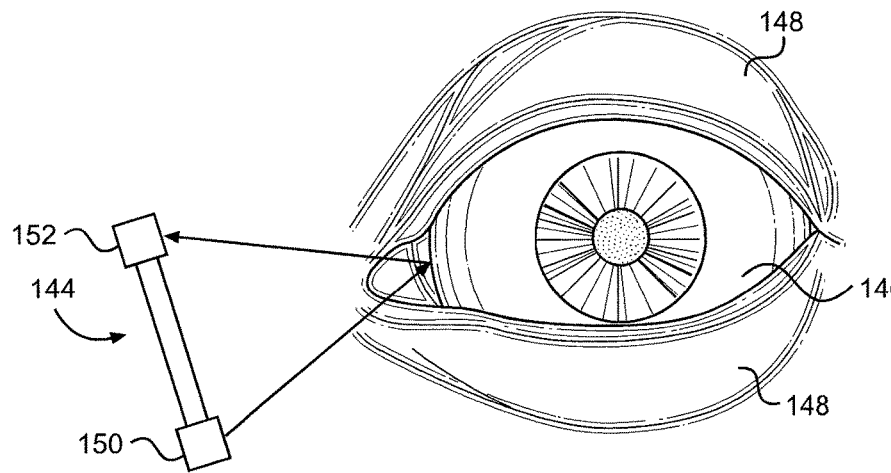
FIG. 6 is a front view of an eyelid sensor configured for use with the device and positioned near an eye for monitoring the eye's blink rate.

Referring now to FIG. 6, an eyelid sensor 144 is shown. The eyelid sensor 144 should be placed near the user's eye 146 in a position and orientation such that it can detect when the eyelids 148 are closed. This may be done by incorporating the eyelid sensor 144 into an earpiece, or, alternatively, into an eyeglass device. The eyelid sensor 144 comprises a source 150 and a sensor 152. In operation, the sensor 152 picks up a signal from the source 150 after reflection from the eye 146 or eyelid 148. By detecting alterations in the strength of the reflected signal, the eyelid sensor 144 is able to determine when the eye 146 is closed and when it is opened.

Some embodiments of the device use neurosensors to detect the user's blink rate, obviating the need for an eyelid sensor 144 in those embodiments. Traditionally, the effects of eye blinks on neurosensors, and particularly EEG sensors, have been treated as artifacts to be removed. Some embodiments of the device 100 use similar algorithms to those developed for removal of the eye blink artifacts, but rather than remove the "artifacts," the device 100 uses methods for recognizing eye blinks to track the user's blink rate, and is able to do so with sufficient accuracy to eliminate the need for a separate eyelid sensor 144 in those embodiments.

Figure 7:
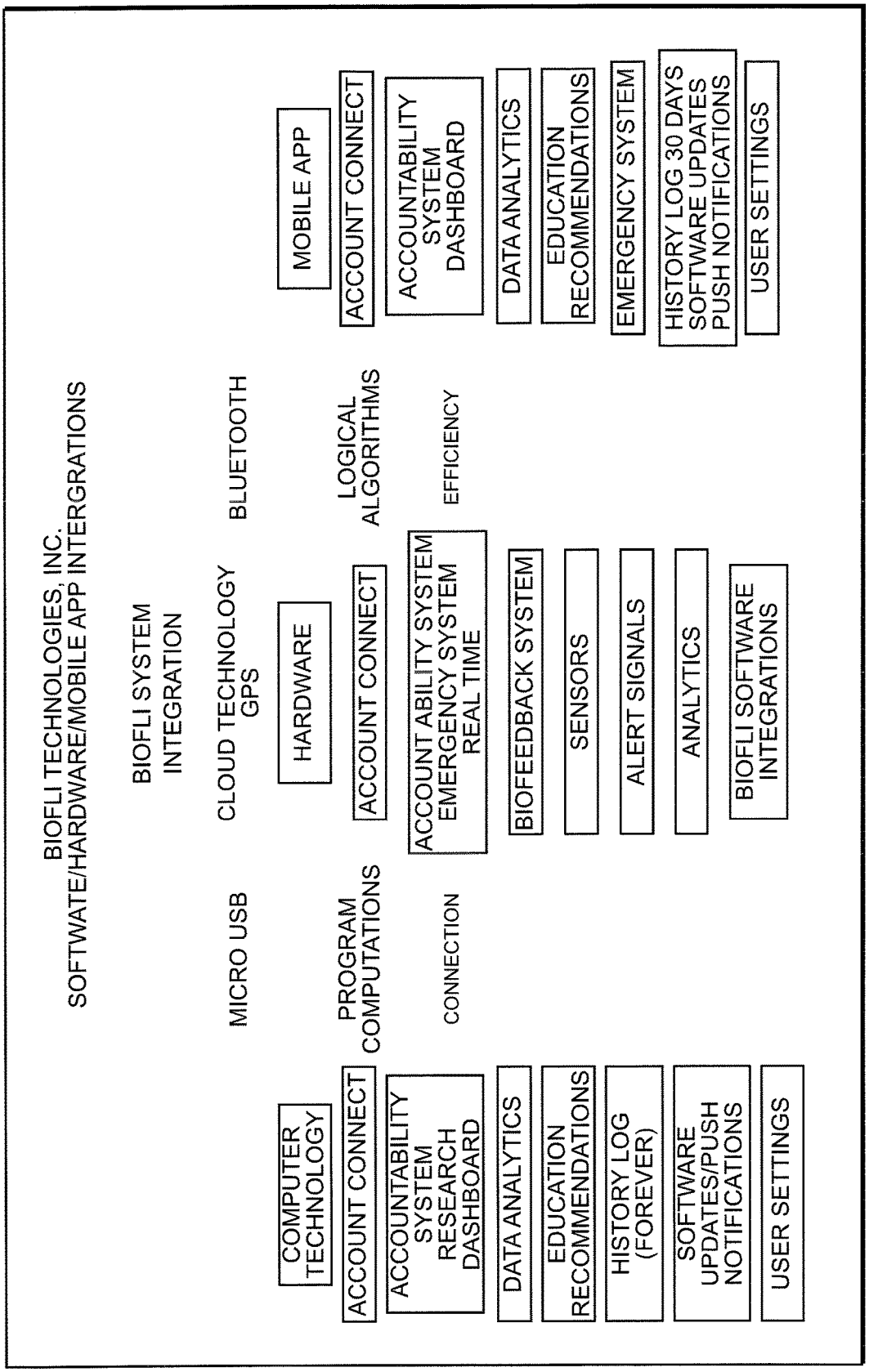
FIG. 7 is a diagram demonstrating a preferred embodiment of the present invention including a situational awareness sensor device, a computer, a mobile application, and interaction with a DASA system.

Referring now to FIG. 7, a diagram of the present invention is shown. The situational awareness sensor device 100, including any external sensor or alert attachments, can communicate with either a mobile device or a computer, or both. The communication includes uploading sensor readings to the computer or mobile device, as well as receiving data, software, instructions, and parameters (including sensor ranges) from the computer or mobile device. In general, Bluetooth or Wi-Fi is used for communication with a mobile device, and USB via the micro-USB port 124 is used for communication with a computer, though either method of communication may be used with either type of device. Either the computer, running a program, or the mobile device, via a mobile application, facilitates the interaction of the present invention with a dynamic assessment of situational awareness ("DASA") system, such as the DASA system described in U.S. Patent Application Publication No. 2016/0358500, as well as any other interactions between the device 100 and the mobile device or computer. Additionally, either a computer program or a mobile device application uploads the data to an Internet server, and, in some embodiments, downloads instructions from the server. In this way, the user or a manager may also interact with the DASA system through a web browser. The compiled data may be provided via reports and new rules for the situational awareness sensor device 100 may be selected through a web-based interface. Sensor readings from the time of the prior upload, or, if no prior upload has been made, from the entire time of use of the situational awareness sensor device 100, are uploaded to the DASA system. The DASA system uses the data to determine how long the user is able to remain alert at a task and to forecast fatigue conditions of the user. Based on user or manager inputs to the DASA system and sensor data provided to the DASA system by the situational awareness sensor device 100, the DASA system determines a set of expected normal sensor ranges and predicts periods of user fatigue. The DASA system may also provide rules and limits to the situational awareness sensor device 100. For example, the DASA system may provide baseline sensor readings or expected ranges based on the user's age, sex, height, Inseam, sleep, weight, and other characteristics, or based on the average sensor readings over time, or a combination of physical characteristics and historical readings. The DASA system may also prepare and provide rules, including a more restricted set of sensor ranges, to the situational awareness sensor device 100 to follow stricter limits during predicted periods of fatigue. In such cases, the situational sensor device 100 will alert the user based on the more restricted set of sensor range during the predicted fatigue periods.

Figure 8:
FIG. 8 is a chart showing sensor readings which may trigger an alert in the present invention.

Referring now to FIG. 8, conditions used by a preferred embodiment of the situational awareness sensor device 100 to determine when to initiate an alert are shown. Each sensor has an expected value and predetermined ranges about the expected value for normal variations. The expected value and ranges may be adjusted through a computer program or mobile app, or via the DASA system, as discussed above. In particular, a baseline for the particular user is determined by the device 100, which corresponds to a normal condition, or "condition 1." If the user declines alertness and may become fatigued, "condition 2" initiates a heightened parameter check phase. "Condition 3" indicates a more critical situation in which something is wrong, and the device 100 provides a brief warning comprising vibrational and audio alerts to the user. If deviations from the baseline are maintained or increase, the device enters "condition 4" or alert phase, and provides audio, visual, and vibrational alerts for twenty seconds, unless cancelled by the user. If an alert is triggered three times for twenty seconds, emergency personnel will be notified. The alert may include audio or visual alerts, haptic feedback, a text message sent via a connected mobile device to one to three predetermined individuals, or a combination of the foregoing.

In the case of an audio alert, the device 100 will omit a safe intermittent and/or continuous audio sound to alert the user when indicated. An intermittent sound indicates a warning, e.g., that the user may be falling asleep. A constant sound is omitted in the case of a critical alert.

For a visual alert, an LED Red/Amber light will project a bright flash(s) safe to the eyes in/around the leading environment to the user.

The vibrational alert system is designed to alert the user if a critical shift in baseline values. The vibration provides a genuine natural vibrational stimulation to the lower occipital/cervical region between the base of the skull and neck. The reason for this is the physiological processes of the occipital lobe of the brain host the visual cortex (Therefore stimuli are needed). The alert may be a rhythmic intermittent pulse vibration to the occipital base portion of the head or a rhythmical constant pulse vibration.

Before a text message alert is sent, the GPS 126 is activated in order to determine the user's location. In order to conserve device battery capacity, the GPS function is in sleep or disabled until the latest possible moment before location is to be transmitted via a text message. Then a text message will be sent, to alert one to three accountability partners (or employer) in case the user is in a state of fatigued, drowsy (critical receiving). Source examples are: family members, friends, emergency personnel, and remote receiver/storage devices. The data comprised within the text message will have location, time, date, and initial/detailed assessments per device. When activated, this will be tagged as a critical to the user's secure dashboard. Text messages are sent to the mobile device, e.g. a cellphone, in the user's vehicle by the situational awareness sensor device 100 via a Bluetooth link. A "condition 3" or "condition 4" alert can be sent to the user through the notification system of the user's mobile device in some embodiments, in addition to audio, visual, and haptic feedback alerts.

The alert settings are customizable depending on the needs of the user or company issuing the device. The expected value ranges may be adjusted, as well as the requirements for a "condition 3" warning to the user of an alert. For example, a column in FIG. 8 entitled "TWO 'X' From Each Indicator to Alert" illustrates a condition that a company or user might decide to place on one or more sensors in order for an alert to be triggered.

Blood measurements include glucose, electrolytes (including sodium and potassium), and blood flow. Any blood measurements acquired by the device 100 are factored into the drowsiness or situational awareness analysis, but unexpectedly high or low measurements of any may also indicate a separate medical emergency. Moreover, blood measurements may be of particular importance in determining both drowsiness and medical emergency states in some use situations. For example, sodium measurements may be of particular importance when the device 100 is used by a marathon runner, due to the risk of excessive loss of electrolytes through water consumption, sweat, and urination. Thus, preferred embodiments of the situational awareness sensor device alert the user in response to blood measurements outside of predetermined safe ranges, the same as with measurements by the other types of sensor. In some embodiments, the predetermined ranges are programmable through software such as DASA software that communicates with the device 100.

Hyponatremia (sodium deficiency), hypernatremia (an excess of sodium in bodily fluids, generally caused by dehydration), and hypokalemia (potassium deficiency) are among the more common electrolyte imbalances in the human body, so preferred embodiments of the device 100 measure sodium and potassium as mentioned above. This has the advantage of allowing the device 100 (in some embodiments, in combination with the EKG) to monitor for hyperkalemia also, which, although rare, indicates a medical emergency which must be treated immediately in order to avoid cardiac arrest and death. Alternative embodiments measure the various combinations of sodium, potassium, magnesium, calcium, chloride, phosphate, and bicarbonate as the electrolyte measurements.

Cortisol is also measured in some embodiments as an indicator of wakefulness and as an indicator of stress.

Figure 9:
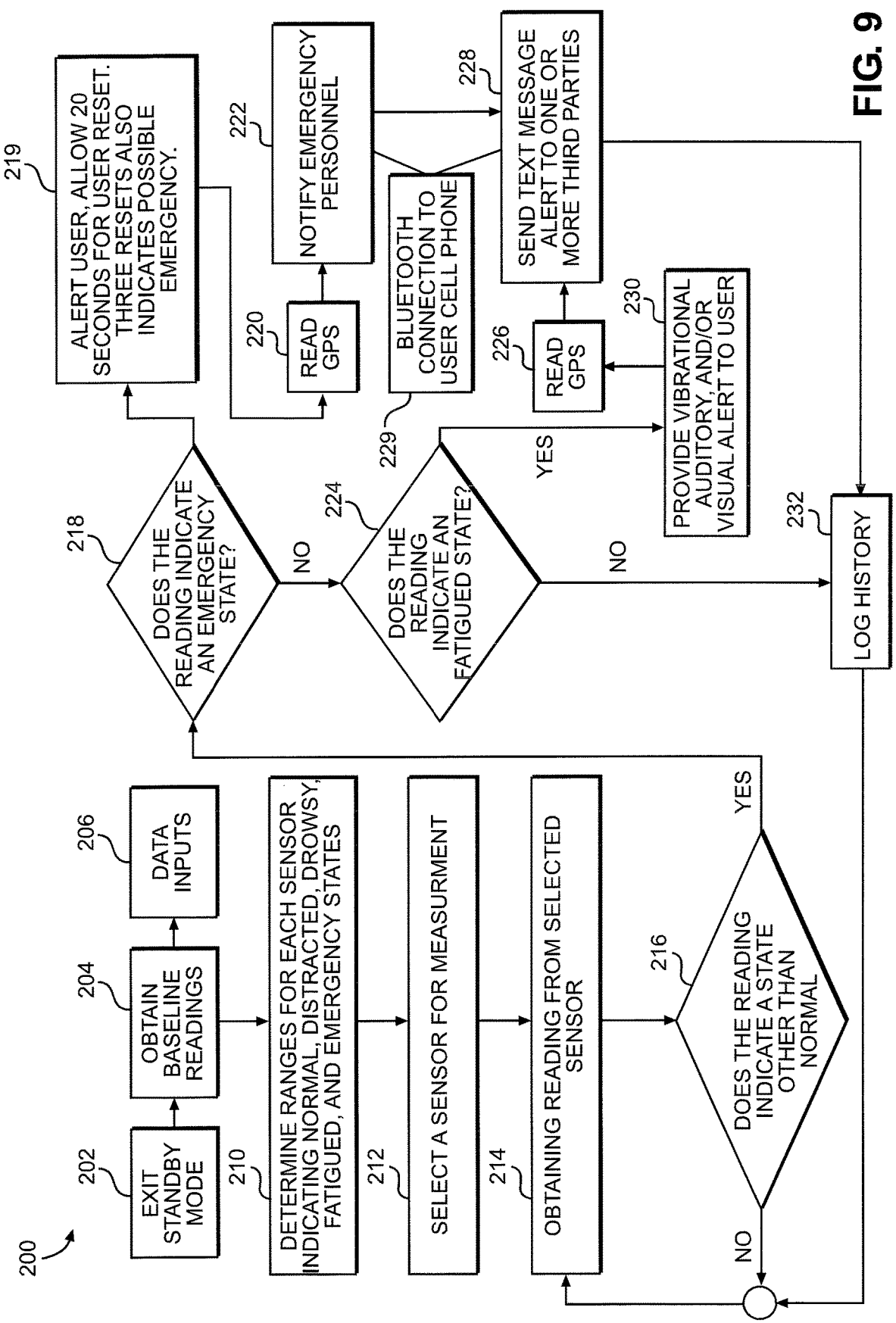
FIG. 9 is a diagram showing a preferred embodiment of a method for tracking situational awareness as used in the present invention.

Referring now to FIG. 9, a general overview of the process used by the situational awareness sensor device 100 of the present invention to monitor the user's situational awareness is depicted and generally designated 200. In addition to the on or off state, the situational awareness sensor device 100 may enter into a standby mode. The device is thus first turned on or exits standby mode 202. Once active, an initial step 204 to obtain baseline readings from data inputs 206 provided by the sensors 114 is performed. After the baseline readings are obtained, a range determination step 210 is performed. In step 210, a set of measurement ranges for each sensor is determined, including a range indicating that the user is in a normal, or alert state, a range indicating that the user may be distracted, a range indicating that the user is drowsy, a range indicating that the user is fatigued and may be falling asleep, and a range indicating an emergency. The emergency state may include readings that suggest a medical emergency, such as a seizure or a heart attack. The ranges may be determined by the DASA system and uploaded to the device 100, or may be preprogrammed into the device 100. In either case, step 210 comprises loading a table of the ranges into the working memory of the microprocessor 116 of the device 100.

A sensor selection step 212 involves the selection of a sensor for measurement and analysis. The sensors read by the device 100 include sensors 114 built into the housing 110 as well as any external sensors. If the microprocessor 116 contains a single processing core, it may be limited to analyzing one sensor at a time, although the step may be repeated thousands or more times per second so that all the sensors appear to be read simultaneously. However, multiple-core microprocessors are common, and preferred embodiments use a multiple-core microprocessor, generally having between two and eight cores, as the microprocessor 116, in which step 212 and the following steps may be performed simultaneously on separate sensors by different cores. It is also contemplated that multiple single-core or multiple-core microprocessors 116 may be included in the present invention to provide the same capability of measuring several sensors simultaneously. Where each core or microprocessor (hereafter "processing unit") is dedicated to a particular sensor, the same sensor will be read by a particular processing unit each time, and step 212 may effectively be eliminated. If a processing unit reads multiple sensors, the readings may be performed in a round-robin fashion, or some sensors may be read more frequently than others.

Once a sensor is selected, a reading step 214 is performed in which a measurement from the sensor is taken. The sensor's reading is provided to working memory through the I/O channels of the processing unit, and the values may be converted into one or more different sets of units by a program running on the processing unit. For example, raw values provided by the accelerometer may be converted into a tilt angle for comparison with a set of ranges that determine whether the user's head is drooping, and also an additional set of appropriate units if the accelerometer is also being used to measure respiration rate.

If the readings from step 214 register no biomarkers, that is, if they indicate that the device 100 is no longer being worn by a user, the device will enter standby or sleep mode to save power, or in alternative embodiments shut down.

Once a sensor reading has been obtained, a first comparison step 216 is performed to determine whether the reading is outside the normal range. Step 216 comprises a comparison of the value obtained, and possibly pre-processed, in step 214 with the values for the normal range provided in step 210. If the value obtained from step 214 is within the normal range, the processing unit returns to step 212. In a preferred embodiment of the present invention, a reading other than normal is corroborated with at least one other sensor before determining whether to return to step 212 or proceed with an alert. Where multiple processing units are present, the corroboration may be performed by a request to one or more other processing units to provide readings from the other sensors. Otherwise, the processing unit that has just read a reading outside the normal range will read from each of the other sensors in turn and compare their values to the normal range. If one or more additional sensors fall outside the normal range, but do not indicate the same user state (emergency, fatigued, drowsy, or distracted) as the initial sensor reading, the device 100 must determine which reading to use for the following steps. One embodiment of the present invention proceeds with the reading obtained in step 214. Another embodiment selects the most critical reading, wherein the range categories arranged from most critical to least critical are: emergency, fatigued, drowsy, distracted, and normal. Yet another embodiment uses a predetermined priority ranking of each of the sensors, which may be programmed into the device 100, provided by the user, or provided as a rule from the DASA system, and selects the reading from the sensor with the highest priority ranking.

If the sensor reading is outside the normal range, a second comparison step 218 is performed. In step 218, the reading is compared to the emergency range. In an emergency range or potential spurious alert, the device will use all alert 219 indicators for twenty or more seconds. The alert 219 to the user may include a vibration of vibration pads 118, an audio alert, a visual alert, or a combination of the foregoing. If the user is alert, the user will depress on/off switch to indicate alertness/reset of device before the twenty (20) second count of emergency range. If the alert indicators are present after twenty or more seconds with no response, the device will determine it to be an emergency situation. Three resets by the user within a short period of time also indicates a possible emergency situation. When the device has determined that the alerts indicate an emergency situation, the device 100 determines the user's location 220, and notifies emergency personnel 222 of the user's emergency and location.

If the reading is not within the emergency range, a third comparison step 224 is performed. In step 224, the reading is compared to the fatigued range, which indicates that the user is fatigued and may be falling asleep. If the reading falls within the fatigued range, the device 100 provides vibrational, auditory, and visual alerts 230, determines the user's location 226, and sends a text message alert 228 to one or more third parties to notify them that the user may be in danger. A text message alert 228 including the user's location may be sent to virtually any number of third parties, limited only by the amount of memory available to store third-party contact information. However, a preferred embodiment of the present invention sends the text message alert 228 to one to three third parties in order to set a practical upper limit. The text message alert 228 is also sent after the notification to emergency personnel 222 when the reading falls within the emergency range for at least twenty seconds. The alert 230 to the user may include a vibration of vibration pads 118, an audio alert, a visual alert, or a combination of the foregoing. If the reading is outside the normal range, but nonetheless does not indicate an emergency or fatigued state, only alert 230 is provided. Otherwise, the user alert 230 is provided along with the notification to emergency personnel 222 and the text message alert 228 to one or more third parties.

In a preferred embodiment, a Bluetooth connection 229 to the user's mobile phone is used to send the text message alert 228 and the notification to emergency personnel 222. Nonetheless, the present invention may also include an internal radio configured to operate on a mobile network in order to send the alerts without needing to communicate with the user's mobile phone.

At this point, the device 100 may monitor the sensors until the readings return to the normal range, at which time the device 100 would return to step 212 and continue normal operation.

A preferred embodiment of the device 100 also monitors and corrects the user's posture. Poor posture can indicate fatigue, and can also accelerate its onset. Additionally, a forward tilt of the head, which the present invention is uniquely positioned to measure, can put pressure on the neck and spine, resulting in both short and long-term effects such as neck pain or postural pain syndrome.

A separate process running on the microprocessor handles, in conjunction with the motion detection sensors and the vibration pads 118, the posture monitoring and correction feature. A set of ranges for the accelerometer measurements is associated with good posture. An algorithm, using the individual's baseline, determines whether measurements outside of the good posture parameters indicates that the user is slouched or in another position indicating poor posture. If so, a vibrational alert is initiated to alert the user to correct his or her posture. No other sensors are consulted as a prerequisite to posture alerts. The algorithm uses a set of heuristics to determine what type of poor posture may be indicated by accelerometer measurements outside the good posture parameters. For example, if changes to the accelerometer readings indicate that the user has bent over quickly, the user may be about to lift an object from a poor position, and a vibrational alert is sent immediately. On the other hand, if the readings indicate that the user has slouched somewhat, it may indicate that the user is simply making a momentary observation on a desk or dashboard, or engaging in some other expected action, and so the algorithm would provide a grace period for the user to return to a position within good posture limits before initiating an alert.

In general, the posture alerts are an optional feature which may be activated or deactivated by the user. The activation and deactivation mechanism may comprise a button or switch on the device 100 itself, or a setting in a computer program or mobile application which sends a rule to the device to activate or deactivate the feature.

Figure 10:
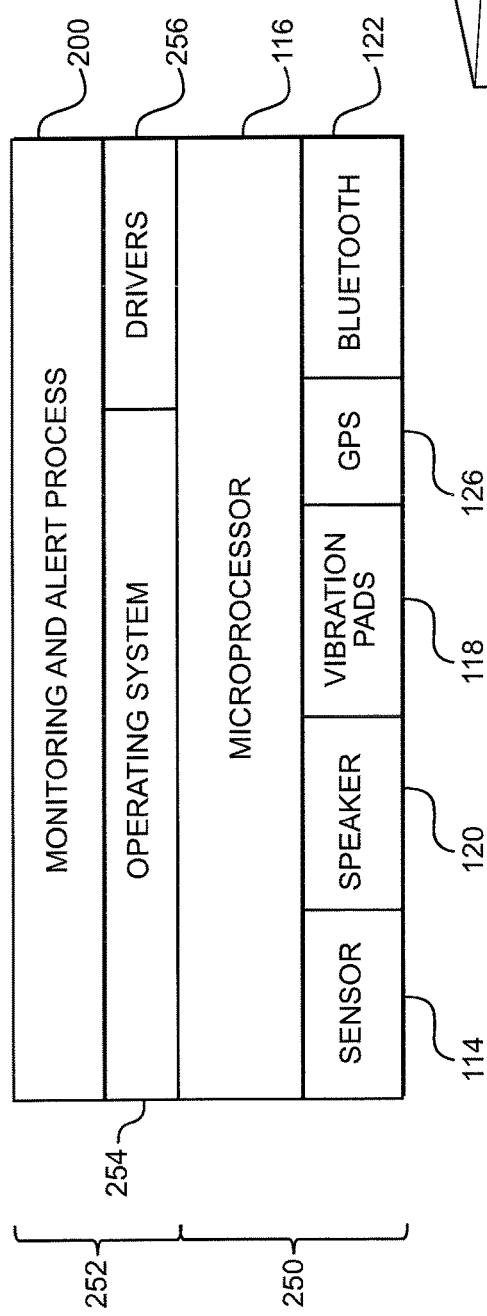
FIG. 10 is a diagram of the hardware and software components of the situational awareness sensor device of the present invention.

Referring now to FIG. 10, a diagram of the hardware and software layers of the situational awareness sensor device 100 is shown. The device 100 can be conceptually divided into a hardware layer 250 and a software layer 252. The hardware layer 250 comprises the various hardware devices of the device 100, including the sensors 114, speaker 120, vibration pads 118, GPS receiver 126, and Bluetooth 122. Other hardware devices, such as WiFi or external sensors also form a part of the hardware layer 250. The microprocessor 116 sits at the top of the hardware layer 250, providing a platform for the software layer 252 and mediating its access to inputs and outputs on the hardware layer 250.

At the base of the software layer 252 is an operating system 254 and drivers 256. In a preferred embodiment of the present invention, the operating system 254 comprises a Linux kernel. The Linux kernel is well documented and provides support for a broad range of hardware, and is thus easily adapted to the needs of the present invention. More particularly, the operating system 254 in a preferred embodiment is an Android operating system. Android is a Linux-based operating system adapted for consumer electronics, and providing a well-known platform for software development. The drivers 256 generally run on the kernel layer and provide routines for the operating system 254 and other applications on the software layer to access the devices of the hardware layer 250.

The process 200 depicted in FIG. 9 runs as a user space application on top of the operating system 254, and is able to access data from the sensors 214, send alerts via the speaker 120 and vibration pads 118, and access the GPS 126, Bluetooth radio 122, and other hardware through the drivers 256.

Since the process 200 is a user space application, it can run concurrently with or be replaced by other processes. A preferred embodiment of the device 100 is used for measuring situational awareness and fatigue while the user is awake, and for sleep measurement and analytics while the user is asleep. Before going to sleep, the user switches the device 100 into an "iREM mode." After waking up, the user switches the device 100 back into a mode for measuring situational awareness and fatigue. In iREM mode, the device uses accelerometer readings to track sleep and wakefulness, and EEG and neurosensor readings to measure time spent in each of stages 1-4 and REM sleep. In some embodiments, a switch or dedicated button is used to switch the device 100 into and out of iREM mode, while in other embodiments a pattern of pushes of the on/off button 128, such as (for example) a double-click of the on/off button 128, is used to switch the device 100 into and out of iREM mode.

As mentioned above, the device 100 may enter a standby mode for lower power consumption when the device 100 is not in use. More particularly, the user may trigger standby mode with the on/off button, and the device 100 will automatically enter standby mode after sensor readings indicate that the device 100 has not been in use for a predetermined period of time (e.g., no pulse or EEG readings). Preferred embodiments of the present invention enter standby mode after either two or three minutes of non-use.

In some situations, it may not be desirable to allow the user to deactivate the device 100 or to put it into standby mode. For example, an employer may not want the device 100 to be deactivated when the device 100 is being used to monitor an employee's wakefulness and alert the employer of employee drowsiness during the performance of potentially dangerous activities. As another example, a user may want to avoid accidentally deactivating the device when wearing it in situations in which an accidental press of the on/off button. Accordingly, some alternative preferred embodiments do not allow deactivation of the device 100 or placement of the device 100 through the use of an on/off button. Other alternative preferred embodiments allow the device 100 to be programmed by the user through external software on a computer or mobile device in order to enable or disable the on/off button.

Figure 11:
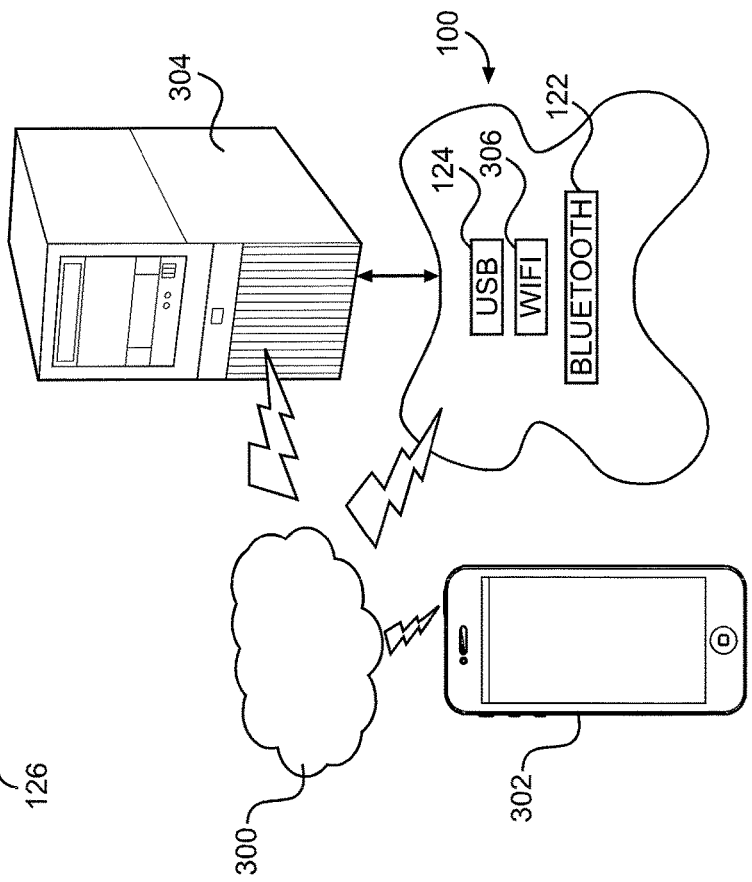
FIG. 11 is a diagram of communication between the situational awareness sensor device, external devices, and an Internet-based DASA system.

Referring now to FIG. 11, the situational awareness sensor device 100 communicates with a cloud or Internet-based server 300 comprising a DASA system, either indirectly via the user's mobile device 302 or computer 304, or directly through an Internet connection using a WiFi radio 306 in the device 100. Generally a mobile device 302 will communicate with the situational awareness sensor device 100 through Bluetooth 122, and a computer 304 will communicate with the device 100 through the micro-USB port 124 on the device 100. Through the direct or indirect communication, the situational awareness sensor device 100 is able to store sensor tracking history and to receive cloud-delivered software upgrades. When a mobile device 302, usually a user's mobile phone, is connected to the situational awareness sensor device 100 via Bluetooth 122, the situational awareness sensor device 100 will sync with the mobile device 302 every thirty seconds or less, in addition to whenever updates are requested by the mobile device 302. The sync process, which is separate from the issuance of an alert, comprises transfer of sensor data and activity tracking data. When a user has an application for viewing the situational awareness sensor device 100 statistics open and visible on the mobile device 302, the mobile device 302 will request continuous updates in order to display real-time activity tracking data.

When the situational awareness sensor device 100 is about to enter standby mode, the situational awareness sensor device 100 will sync with a mobile device 302, if one is connected via Bluetooth, in order to store the up-to-date sensor and activity tracking history before entering standby mode.

While there have been shown what are presently considered to be preferred embodiments of the present invention, it will be apparent to those skilled in the art that various changes, combinations, and modifications can be made herein without departing from the scope and spirit of the invention.

What is claimed is:

1. A situational awareness tracking device, comprising:
a housing shaped to fit on the back surface of a wearer's neck and having a left side, a right side, and a plurality of sensors comprising:
a first brain activity sensor located in the left side,
a second brain activity sensor located in the right side,
a first heart sensor located in the left side,
a second heart sensor located in the right side,
a first temperature sensor located in the left side, and
a second temperature sensor located in the right side;
an alert system;
an accelerometer;
a microprocessor; and
a computer-readable storage comprising a first process comprising instructions configured to cause the microprocessor to obtain readings from the plurality of sensors, compare the readings from the plurality of sensors to a first set of value ranges in order to determine whether an abnormal state exists, and activate the alert system when the abnormal state exists,
wherein the first process further comprises instructions configured to cause the microprocessor to, obtain an accelerometer reading, compare the accelerometer reading to a predetermined range of posture parameters, and activate the alert system when the accelerometer reading is outside the predetermined range of posture parameters.

2. The situational awareness tracking device as recited in claim 1, wherein the computer-readable storage further comprises a second process comprising instructions configured to cause the microprocessor to obtain accelerometer readings to track sleep and wakefulness.

3. The situational awareness tracking device as recited in claim 2, wherein the second process further comprises instructions configured to cause the microprocessor to obtain brain activity sensor readings to measure time spend in sleep stages one through four and REM sleep.

4. The situational awareness tracking device as recited in claim 3, further comprising a user input mechanism configured to switch between execution of the first process and execution of the second process.

5. The situational awareness tracking device as recited in claim 1, configured to upload the readings from the plurality of sensors to a DASA system.

6. A situational awareness tracking device, comprising:
a housing shaped to fit on the back surface of a wearer's neck and having a left side, a right side, and a plurality of sensors comprising:
a first brain activity sensor located in the left side,
a second brain activity sensor located in the right side,
a first heart sensor located in the left side,
a second heart sensor located in the right side,
a first temperature sensor located in the left side, and
a second temperature sensor located in the right side;
an alert system;
a microprocessor; and
a computer-readable storage comprising a first process comprising instructions configured to cause the microprocessor to obtain readings from the plurality of sensors, compare the readings from the plurality of sensors to a first set of value ranges in order to determine whether an abnormal state exists, and activate the alert system when the abnormal state exists,
wherein the situational awareness tracking device is configured to upload the readings from the plurality of sensors to a DASA system and further configured to receive the first set of value ranges and a second set of value ranges from the DASA system, wherein the first process comprises instructions configured to cause the microprocessor to compare the readings from the plurality of sensors to the second set of value ranges during predicted periods of fatigue.

7. The situational awareness tracking device as recited in claim 1, configured to send sensor readings to a mobile device.

8. The situational awareness tracking device as recited in claim 7, configured to receive cloud-delivered software upgrades through the mobile device.

9. A situational awareness tracking device, comprising:
a housing shaped to fit on the back surface of a wearer's neck and having:
a left brain activity sensor region,
a right brain activity sensor region,
a left heart sensor region,
a right heart sensor region,
a left temperature sensor region, and
a right temperature sensor region;
a plurality of sensors, comprising:
a left brain activity sensor located in the left brain activity sensor region and selected from the group consisting of an EEG sensor and a neurosynaptic sensor,
a right brain activity sensor located in the right brain activity sensor region and selected from the group consisting of an EEG sensor and a neurosynaptic sensor,
a left heart rate sensor located in the left heart sensor region,
a right heart rate sensor located in the right heart sensor region,
a left temperature sensor located in the left temperature sensor region, and
a right temperature sensor located in the right temperature sensor region;
an alert system;
a microprocessor; and
a computer-readable storage comprising a first process comprising instructions configured to cause the microprocessor to obtain readings from the plurality of sensors, compare the readings from the plurality of sensors to a first set of value ranges in order to determine whether an abnormal state exists, and activate the alert system when the abnormal state exists;
wherein the situational awareness tracking device is configured to upload the readings from the plurality of sensors to a DASA system and further configured to receive the first set of value ranges and a second set of value ranges from the DASA system, wherein the first process comprises instructions configured to cause the microprocessor to compare the readings from the plurality of sensors to the second set of value ranges during predicted periods of fatigue.

10. The situational awareness tracking device as recited in claim 9, further comprising an accelerometer.

11. The situational awareness tracking device as recited in claim 10, wherein the first process further comprises instructions configured to cause the microprocessor to obtain an accelerometer reading, compare the accelerometer reading to a predetermined range of good posture parameters, and activate the alert system when the accelerometer reading is outside the predetermined range of good posture parameters.

12. The situational awareness tracking device as recited in claim 10, wherein the computer-readable storage further comprises a second process comprising instructions configured to cause the microprocessor to obtain accelerometer readings to track sleep and wakefulness.

13. The situational awareness tracking device as recited in claim 12, wherein the second process further comprises instructions configured to cause the microprocessor to obtain brain activity sensor readings to measure time spend in sleep stages one through four and REM sleep.

14. The situational awareness tracking device as recited in claim 13, further comprising a user input mechanism configured to switch between execution of the first process and execution of the second process.

15. The situational awareness tracking device as recited in claim 9, configured to send sensor readings to a mobile device.

16. The situational awareness tracking device as recited in claim 15, configured to receive cloud-delivered software upgrades through the mobile device.

* * * * *